United States Patent
Burd (10) Patent No.: US 10,239,618 B2
(45) Date of Patent: Mar. 26, 2019

(54) L SHAPED GUIDE VANES FOR CONTROLLING AND DIRECTING AIRFLOW IN A GALLEY CHILLED COMPARTMENT

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 890 days.

(21) Appl. No.: 14/464,004

(22) Filed: Aug. 20, 2014

(65) Prior Publication Data
US 2015/0059386 A1   Mar. 5, 2015

Related U.S. Application Data

(60) Provisional application No. 61/872,099, filed on Aug. 30, 2013.

(51) Int. Cl.
*B64D 11/04* (2006.01)
*B64D 13/06* (2006.01)
(Continued)

(52) U.S. Cl.
CPC ............ *B64D 11/04* (2013.01); *B64D 13/00* (2013.01); *B64D 13/06* (2013.01); *F25D 17/06* (2013.01);
(Continued)

(58) Field of Classification Search
CPC ..................................................... B64D 11/04
(Continued)

(56) References Cited

U.S. PATENT DOCUMENTS 2,066,832 A   1/1937 Gay
2,315,947 A * 4/1943 Edmonson ............ B65D 5/705
                                                  222/556
(Continued)

FOREIGN PATENT DOCUMENTS

CA   2753273 C   5/2014
CN   1629503 A   6/2005
(Continued)

OTHER PUBLICATIONS

Lindeburg, Mechanical Engineering Reference Manual, 1990, Professional Publications, 8th Edition, pp. 3-14, 3-19.*
(Continued)

*Primary Examiner* — Kenneth Rinehart
*Assistant Examiner* — Phillip Decker
(74) *Attorney, Agent, or Firm* — Donna P. Suchy (57) ABSTRACT

An apparatus for controlling airflow in a duct of an aircraft galley chiller includes first and second legs having ends connected together to form a vane, and free ends configured to be attached within the duct. A free end of one first leg may have a beveled edge, and the free end of the other leg may have a flat edge, and each leg may have one or more score lines to aid cutting lengths of the first and second legs. The legs are connected together at a predetermined fixed angle, or at an adjustable angle, such as by an adjustable hinge. A pair of opposing vanes may be attached within opposing sides of the duct to form a venturi within the duct.

19 Claims, 6 Drawing Sheets

(51) Int. Cl.
*F25D 17/06* (2006.01)
*B64D 13/00* (2006.01)
*F24F 13/14* (2006.01)

(52) U.S. Cl.
CPC ...... *B64D 2013/0629* (2013.01); *F24F 13/14* (2013.01); *F25D 2317/063* (2013.01)

(58) Field of Classification Search
USPC ..... 454/322; 137/269, 797, 802; 138/44, 45, 138/46, 178
See application file for complete search history.

(56) References Cited

U.S. PATENT DOCUMENTS

| | | | |
|---|---|---|---|
| 2,440,052 A | | 4/1948 | Lingen et al. |
| 2,546,673 A | | 3/1951 | Mattix et al. |
| 2,926,777 A | * | 3/1960 | Maguire ................ B65D 5/029 |
| | | | 206/761 |
| 3,072,008 A | * | 1/1963 | Lang ...................... B21D 53/36 |
| | | | 411/443 |
| 3,114,505 A | | 12/1963 | Kennedy |
| 3,604,625 A | | 9/1971 | Waeldner |
| 3,894,563 A | | 7/1975 | Pausch |
| 4,349,110 A | * | 9/1982 | Hayashi ................. B65D 85/78 |
| | | | 229/101.1 |
| 4,434,416 A | * | 2/1984 | Schonberger .......... G01K 7/223 |
| | | | 219/121.67 |
| 4,467,960 A | * | 8/1984 | Doyle, Jr. ........... F28D 21/0008 |
| | | | 454/21 |
| 4,676,145 A | * | 6/1987 | Allred ....................... F24F 7/00 |
| | | | 454/276 |
| 4,729,143 A | * | 3/1988 | Dawson .................. B05C 21/00 |
| | | | 15/146 |
| 5,103,564 A | * | 4/1992 | MacDonald .............. B26B 9/00 |
| | | | 30/346.61 |
| 5,388,798 A | * | 2/1995 | Glick ..................... A47G 1/142 |
| | | | 248/453 |
| 6,484,979 B1 | * | 11/2002 | Medlin, Jr. ............. H02G 3/125 |
| | | | 248/205.1 |
| 6,508,023 B2 | * | 1/2003 | Moss ....................... G09F 1/06 |
| | | | 40/610 |
| 6,880,351 B2 | | 4/2005 | Simadiris et al. |
| 7,921,568 B2 | * | 4/2011 | Green ....................... B26B 9/00 |
| | | | 30/346.52 |
| 8,056,349 B2 | | 11/2011 | Oswald |
| 8,474,274 B2 | | 7/2013 | Schalla et al. |
| 2004/0006948 A1 | * | 1/2004 | Nahas ....................... E04B 9/24 |
| | | | 52/749.12 |
| 2005/0050734 A1 | * | 3/2005 | Kesinger ................ B26B 5/002 |
| | | | 30/162 |
| 2006/0249945 A1 | * | 11/2006 | Clifton, Jr. .............. B60R 22/00 |
| | | | 280/801.1 |
| 2008/0163554 A1 | * | 7/2008 | Kibbel ...................... E06B 1/14 |
| | | | 49/381 |
| 2009/0044547 A1 | * | 2/2009 | Oswald ................. F25D 11/003 |
| | | | 62/89 |
| 2010/0050665 A1 | * | 3/2010 | Oswald ................. F25D 11/003 |
| | | | 62/89 |
| 2010/0224726 A1 | * | 9/2010 | Lu .......................... F25D 17/06 |
| | | | 62/507 |
| 2010/0251672 A1 | * | 10/2010 | Weissbrod ............. B65D 77/24 |
| | | | 53/444 |
| 2011/0277489 A1 | * | 11/2011 | Schalla .................... A47B 31/02 |
| | | | 62/89 |
| 2012/0222443 A1 | | 9/2012 | Simadiris et al. |
| 2016/0007882 A1 | * | 1/2016 | Bates ....................... A61B 5/08 |
| | | | 600/538 |

FOREIGN PATENT DOCUMENTS

| | | |
|---|---|---|
| CN | 101809387 A | 8/2010 |
| ES | 2270262 T3 | 4/2007 |
| JP | S614854 A | 1/1986 |

OTHER PUBLICATIONS

International Search Report, dated Nov. 20, 2014, 4 pages, from PCT/US2014/052998.
International Preliminary Report on Patentability dated Mar. 1, 2016 for PCT/US2014/052998.
Office Action dated Aug. 23, 2018 for Chinese Patent Application No. 201480047248.1.

* cited by examiner

L SHAPED GUIDE VANES FOR CONTROLLING AND DIRECTING AIRFLOW IN A GALLEY CHILLED COMPARTMENT

CROSS-REFERENCES TO RELATED APPLICATIONS

This application is based upon and claims priority from U.S. Application No. 61/872,099, filed Aug. 30, 2013, incorporated by reference in its entirety.

BACKGROUND

This invention relates generally to aircraft galley chilling system parts, and more particularly relates to devices for directing and restricting airflow within an aircraft chilling system.

Large commercial passenger-carrying airplanes are typically equipped with a food and beverage preparation area referred to as a galley. Galleys often have inserts or carts that may be removed and reinserted into the galleys These carts may be used to carry perishables, beverages, ice, and the like. The galley may include a refrigerator (also known as a chiller) system to prevent spoilage, chill beverages, and/or maintain ice. The chillers may refrigerate carts (and other compartments) within the galley by propelling cooled air through an air-circulation system or ducting within the galley. Depending on several factors such as a galley's duct design, number of carts, cart configuration, and the design of the carts, the chiller may distribute chilled air unevenly. For example, center carts may receive more cold air circulation than outer carts. As another example, carts in a galley configured with only two carts may receive higher volumes of chilled air than carts in a four-cart galley. Furthermore, a galley that has varying sizes of carts and/or compartments may cause a chiller to provide an unbalanced distribution of cold air. The unbalanced air pressure from the chiller may cause over cooling or under cooling in one or more of the carts and/or compartments. One solution to this problem has been to install orifice plates in between a chiller duct system outlet and an inlet to the cart or compartment. An orifice plate is generally a metal or plastic covering with a smaller opening than the outlet/inlet being covered. Due to the smaller opening, the orifice plate restricts the amount of air that can pass through beyond the original opening. Based on the amount of restriction desired, different orifice plates would be used, providing smaller holes for more restriction and bigger holes for less restriction.

However, the designs of typical orifice plates commonly have many problems. It is inefficient for manufacturers to build multiple different orifice plates having different hole sizes to suit a desired amount of restriction rather than a single adjustable solution. Also, having multiple sizes for orifice plates introduces user confusion and error in selection of an appropriate orifice plate. A user may not know exactly which orifice plate to order and make an erroneous guess. If a user orders an incorrectly sized orifice plate, the user would have to order another orifice plate. Sometimes a user needs a hole size in an orifice plate that is between two step sizes made from a manufacturer. In these instances, a user may have to accept an imperfect orifice plate or create their own. Another problem with the traditional orifice plate is the creation of backpressure. Orifice plates, because of their design, create backpressure, which reduces the speed of the airflow past the orifice plate thus affecting air circulation. Orifice plates are also unable to redirect the direction of airflow. It would be desirable for an apparatus that is a one-size-fits-all airflow restrictor that can be finely tuned, redirect airflow, and reduce the effects of backpressure. The present invention meets these and other needs.

SUMMARY OF THE INVENTION

Briefly and in general terms, the present invention provides for a system, method, and apparatus for controlling airflow in a duct of an aircraft galley chiller. The invention provides for one or more L shaped vanes that can be attached within the duct to restrict and direct airflow within an aircraft galley to a user's specific preferences.

The invention accordingly provides for an apparatus for controlling airflow in a duct of an aircraft galley chiller, including first and second legs each having first and second ends, the first and second legs being connected together at the second ends of the first and second legs to form a vane having a protruding joint at the second ends of the first and second legs, and at least one of first ends of the first and second legs being configured to be attached within the duct. In a presently preferred aspect, the first end of the first leg has a beveled edge, and the first end of the second leg has a flat edge. In another presently preferred aspect, the vane can have its angle and leg lengths easily modified. The first leg and the second leg preferably each have at least one score line to aid cutting of the first and second legs for reduction of lengths of the first and second legs. In another presently preferred aspect, the at least one score line of the first leg forms an oblique angle with the first leg such that cutting of the first leg along the at least one score line of the first leg will produce a beveled edge at the first end of the first leg, and the at least one score line of the second leg forms a right angle with the second leg such that cutting of the second leg along the at least one score line of the second leg will produce a flat edge at the first end of the second leg. The first and second legs preferably are connected together at an angle, such as a predetermined fixed angle, or at an adjustable angle, such as by an adjustable hinge, for example.

In another presently preferred aspect, the first and second legs are formed of a solid continuous solid material, such as a rigid material, a stiff malleable material, or a material that becomes malleable when heated, but is inflexible when cooled to room temperature, for example.

In another presently preferred aspect, the invention provides for an apparatus for controlling airflow of an aircraft galley chiller, including a duct of the aircraft galley chiller, and at least one vane attached within the duct, the at least one vane including a first leg having opposing first and second ends; and a second leg having opposing first and second ends, the first and second legs being connected together at the second ends of the first and second legs to form a vane having a protruding joint at the second ends of the first and second legs, and at least one of the first ends of the first and second legs being attached within the duct. In another presently preferred aspect, the at least one vane comprises first and second vanes attached within opposing sides of the duct, the first and second vanes forming a venturi within the duct.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1A:
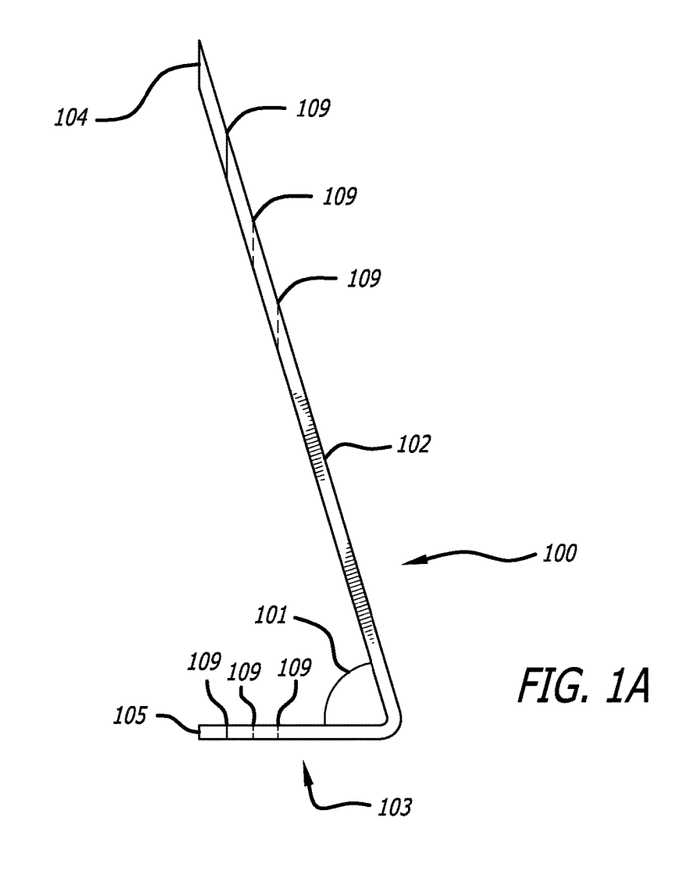
FIG. 1A is a side elevational view of an L shaped vane according to an embodiment.

Referring to the drawings, which are provided by way of example, and not by way of limitation, the present invention provides for an apparatus for reducing airflow from a chiller into a cart or compartment within the galley that is also easily adjustable FIG. 1A illustrates an L shaped vane 100 according to an embodiment. L shaped vane 100 may be made of a continuous solid material (such as steel, aluminum, other metals, plastic, carbon fiber, rubber or any other suitable material) with a fixed angle 101 between a first leg 102 and a second leg 103. Alternatively, L shaped vane 100 may be made of a material that is malleable enough to change angle 101 of L shaped vane 100, but stiff enough to withhold against air pressure from a chiller, or the L shaped vane may be made of a material that becomes malleable when heated, but is relatively inflexible when cooled to room temperatures or less. This may allow for the angle to be adjusted. Additionally, L shaped vane 100 may be made of a material with a thickness that is readily cut such that the length of legs 102 and 103 can be easily shortened.

First leg 102 may have a beveled edge 104 such that when L shaped vane 100 is installed to a galley duct, the beveled edge may be configured to be parallel with a straight side of a wall of the duct. Second leg 103 may have a flat edge 105 which may be flush with the side of the wall of the duct and can be used to restrict airflow in the airflow path. First leg 102 and second leg 103 may have scoring or score lines 109 to aid a user in reducing the length of first leg 102 and/or second leg 103. The scoring 109 on first leg 103 may be angular such that when the length of leg 103 is reduced by a user, leg 103 will still maintain a beveled edge. Furthermore, scoring 109 for each leg may correspond to each other such that the beveled edge on first leg 102 lines up with the edge on second leg 103. One or more L shaped vanes 100 may be used within a duct to restrict or direct airflow. L shaped vanes 100 may be attached to the ducts with L brackets, fitted slots, bolts, glue, welding, solder, and/or any other suitable means.

Figure 1B:
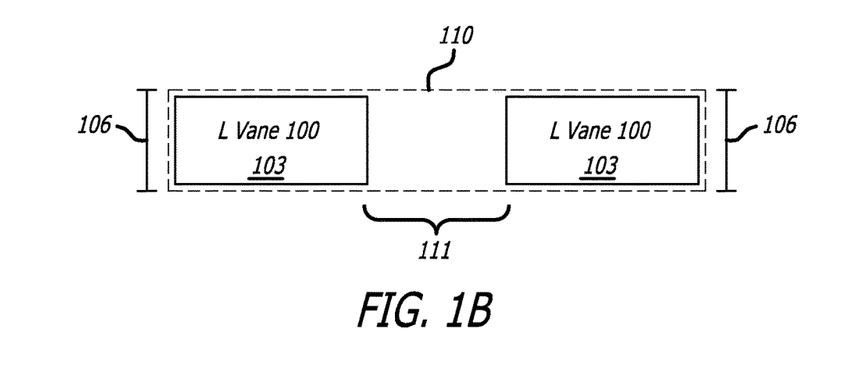
FIG. 1B is a schematic diagram of two L shaped vanes of FIG. 1 used to create a smaller orifice in an air duct.

FIG. 1B illustrates two L shaped vanes 100 inserted into a rectangular chilled air outlet/duct 110. From the front view, only the two second legs 103 of each of the two L shaped vanes 100 are visible. Each L shaped vane 100 may have a width or height 106, such that a protruding joint formed by the legs of the L shaped vanes prevent airflow from passing through the portion of the outlet/ducting 110 that is covered by each leg 103. In this particular embodiment, an orifice 111, which is smaller than duct 110, is created between the two L shaped vanes 100. The two L shaped vanes 100 limit the airflow to just the opening of orifice 111. A user may be able to adjust each L shaped vane 100 to increase airflow by either shortening second legs 103 or removing one of the two L shaped vanes from duct 110, which would create a larger orifice 111.

Figure 1C:
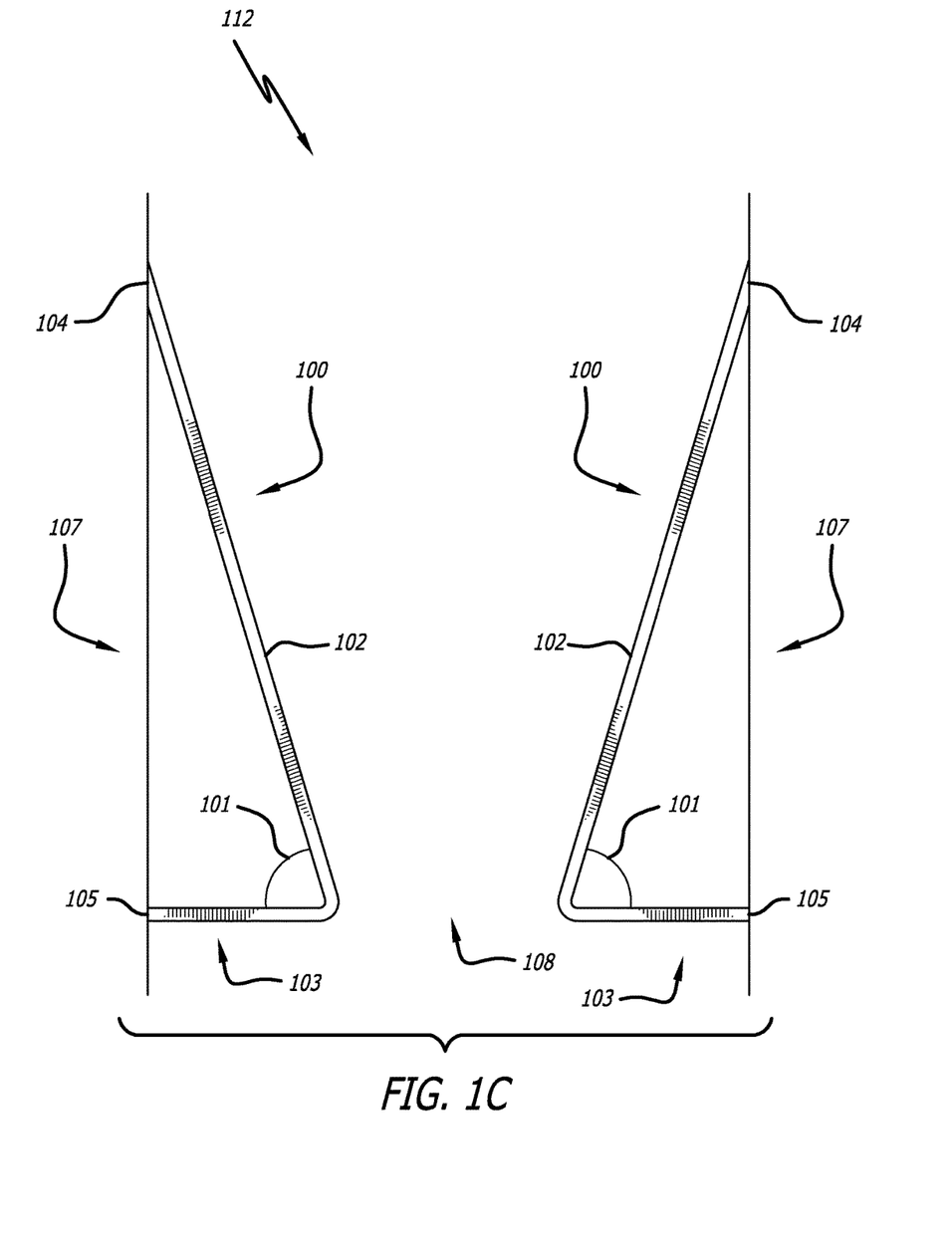
FIG. 1C is a side elevational view of two L shaped vanes of FIG. 1 used to create a smaller orifice and venturi in an air duct.

FIG. 1C illustrates two L shaped vanes 100 with identical angles 101 which create a venturi 112 by facing the legs of each L shaped vane 100 in opposing directions. Edges 104 and 105 of each L shaped vane 100 abuts walls 107 of the chilled air outlet/duct creating a chamfered opening or orifice 108 which is smaller than the space between walls 107 to restrict the flow of chilled air from a chiller. L shaped vanes 100 may be arranged such that second legs 103 of each L shaped vane lines up to extend perpendicularly to walls 107.

Additionally, the two L shaped vanes 100 may be oriented to create the venturi 112 to thus reduce back pressure caused by the restricted orifice 108 and accelerate the air flowing through venturi 106. The accelerated air may promote efficient air circulation in the cart or compartment for which the air is directed.

Figure 2:
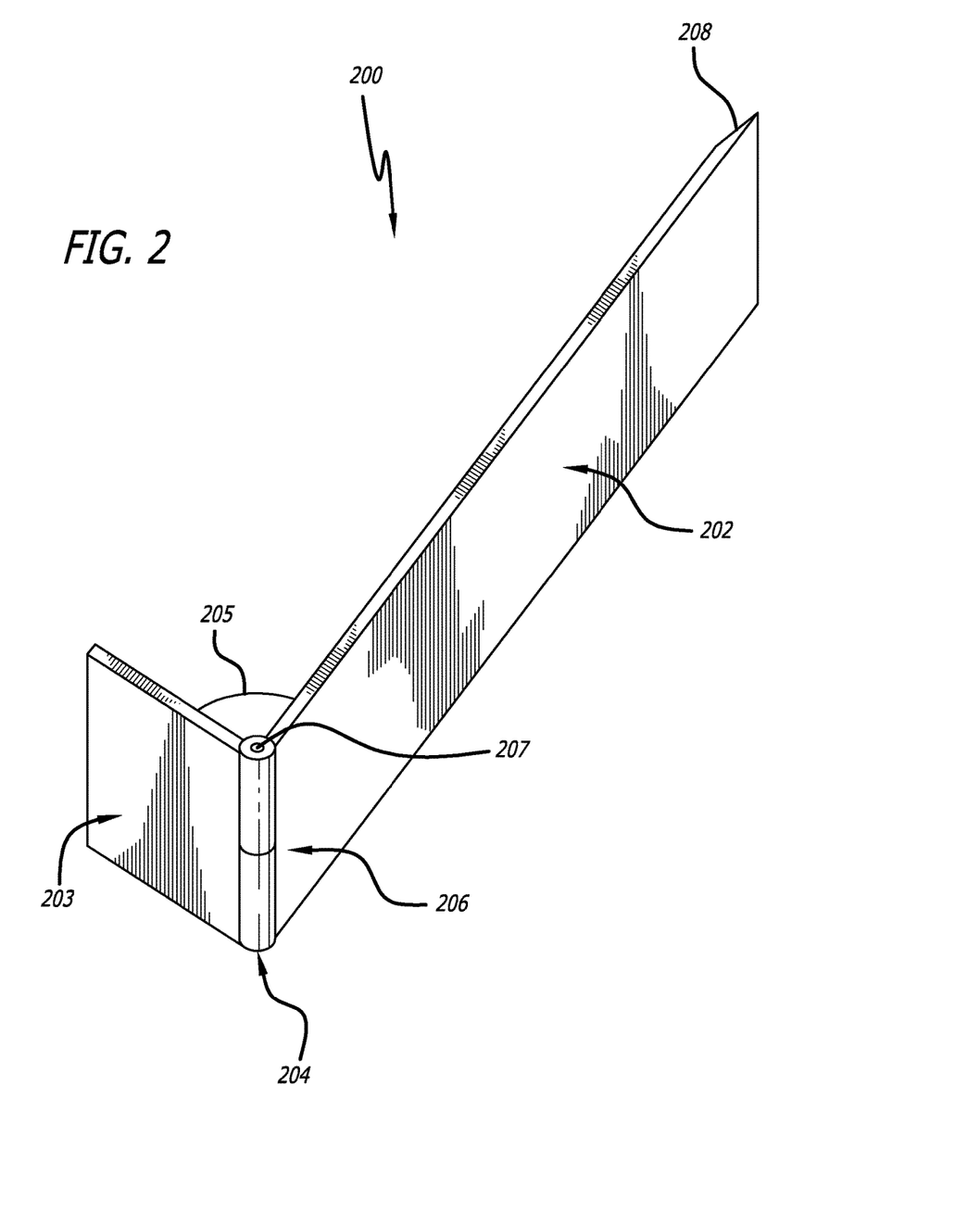
FIG. 2 is a perspective view of a hinged L shaped vane according to another embodiment.

FIG. 2 shows another embodiment of the L shaped vane 200 according to the invention. L shaped vane 200 has an adjustable hinge 204 connecting legs 202 and 203, to allow for the angle 205 of L shaped vane 200 to be adjustable. Hinge 204 may be an indexing hinge. The indexing hinge may have preset grooves or serrations (indexes) 206 which provide a limited set of preset angles to which L shaped vane 200 may be set. Hinge 204 may click into place for each preset angle. In this manner, if multiple L shaped vanes 200 are used in combination, a user may easily be able to match angles of each L shaped vane 200 to be equal and symmetrical. In one aspect, hinge 204 may have a locking screw 207, which when tightened fixes the hinge into place and prevents the change of angle 205. Hinge 204 may allow for smooth rotations instead of indexed presets. The hinge may also have a locking screw that stiffens the hinge.

L shaped vane 200 may also have a tapered or beveled edge 208 for leg 202 and a straight edge for leg 203. The edges may line up with each other along a single plane such that they may abut flush against a straight wall or duct. L shaped vane 200 may be made of a metal such as steel, aluminum, or any other suitable metals; a non-metal material such as plastic, carbon fiber, rubber, or the like, or a combination of such materials.

Additionally, legs 202 and 203 of L shaped vane 200 may be at least partly made of a material with a thickness that is readily cut such that the length of legs 202 and 203 can be easily shortened. Legs 202 and 203 may have scored lines to aid cutting. The scored lines for legs 202 may be angled to maintain a beveled edge and the scored lines for legs 203 may be straight. Each of the scored lines of legs 202 and 203 may line up along a single plane.

Figure 3:
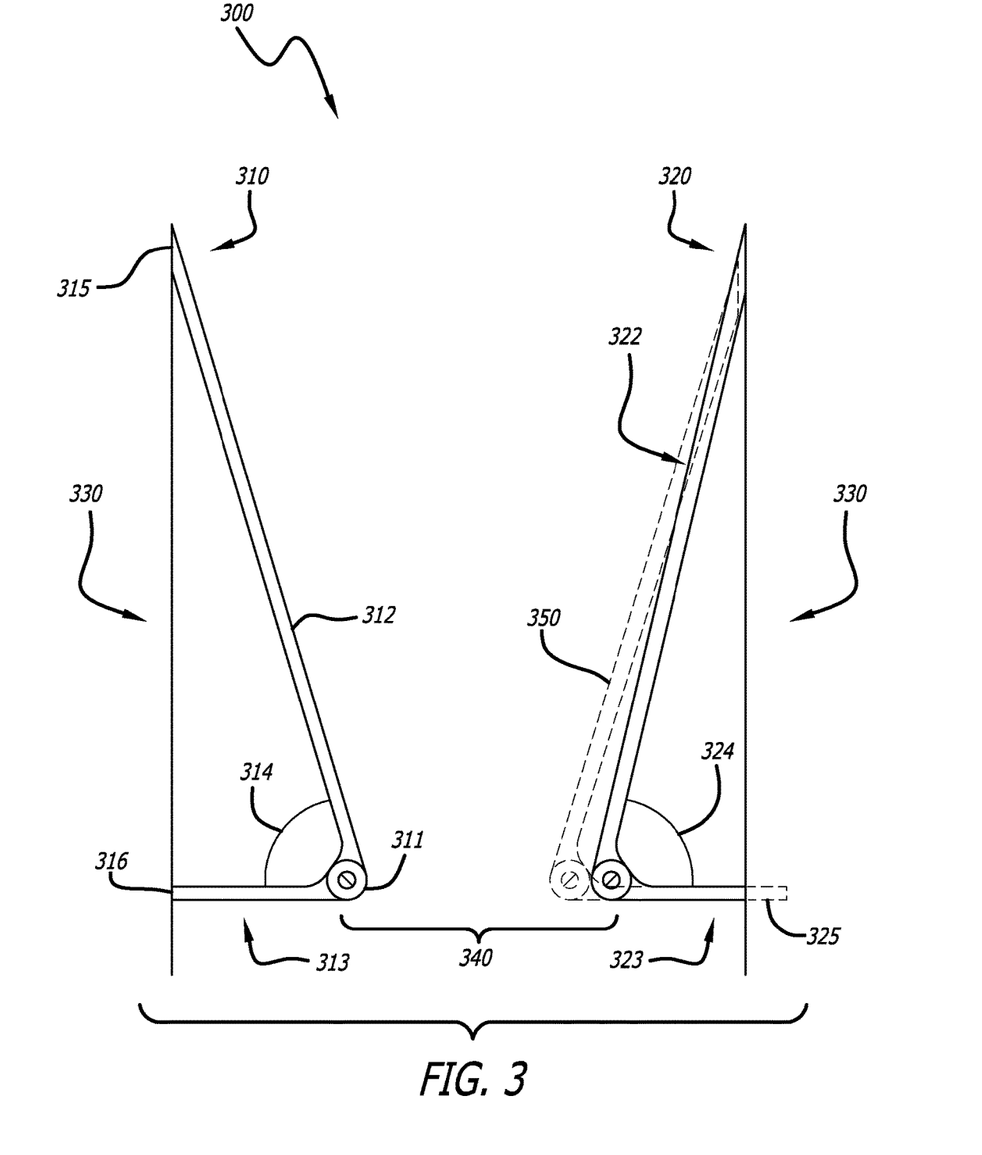
FIG. 3 is a top view of two hinged L shaped of FIG. 2 used to create an asymmetrical venturi for the directional discharge of air.

FIG. 3 is a top view of a venturi 300 created by using two L shaped vanes 200 from FIG. 2, referenced as 310 and 320. L shaped vane 310 includes a hinge 311 connecting legs 312 and 313. L shaped vane 310 may be set at an angle 314. Leg 312 may have a beveled edge 315 which lines up along a single plane with edge 316. The edges 315 and 316 may be used to abut wall 330 along a duct. Alternatively, edge 315 may remain unbeveled rather than beveled.

L shaped vane 320 may be another L shaped vane with legs 322 and 323 like the L shaped vane 310 wherein the user has cut off a portion 325 of leg 323 of L shaped vane 320 and has widened the angle 324. The shortened leg 323 and widened angle 324 effectively increases the size of orifice 340 when aligned with wall 330 opposite the L shaped vane 310. Dotted line 350 illustrates L shaped vane 320 in its original state before being cut and widened. The larger orifice 340 allows for more chilled air to pass through the duct, and the changed angle 324 affects the direction of the chilled air. Also, because L shaped vanes 310 and 320 create a venturi, backpressure created by the smaller orifice size is reduced.

Figure 4A:
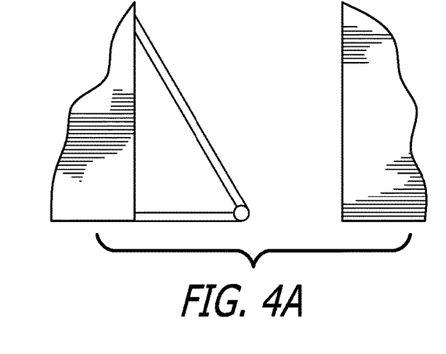
FIGS. 4A-J illustrates multiple orifice configurations that may be achieved by one or more hinged L shaped vanes of FIG. 2.

The versatility of this invention allows for one or more of the L shaped vanes to be used to control and direct airflow in a galley duct or compartment, as desired. FIGS. 4A-E illustrate some of the possible orifices that can be created using a single L shaped vane and FIGS. 4F-J illustrate some of the possible orifices that can be made with two L shaped vanes. FIG. 4A has one L shaped vane that covers most of the chilled air outlet except for a small space on the right. The L shaped vane in FIG. 4A is angled such that an asymmetrical venturi is created with the outlet wall causing chilled air passing through to accelerate towards the left. Though, not shown in the figures, the L shaped vane may be used in a manner that is reversed or flipped from the illustration of FIG. 4A.

Figure 4B:
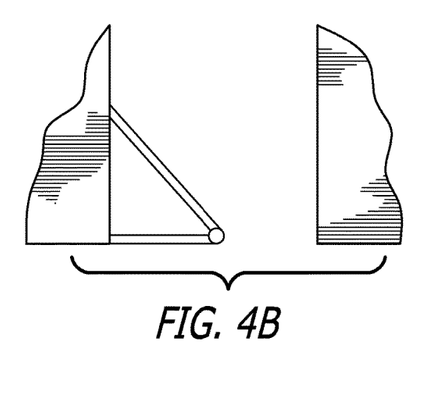

FIG. 4B illustrates an L shaped vane wherein one or more of the legs may have been cut to cover the left half of the chilled air outlet. One of the legs may be angled to accelerate the chilled air entering the orifice in the direction of the leg.

Figure 4C:
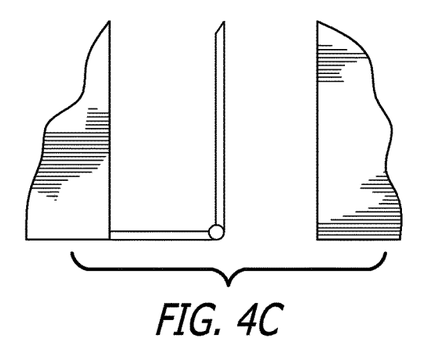

FIG. 4C illustrates an L shaped vane wherein one or more of the legs may have been cut such that one of the legs only covers the left half of the chilled outlet. The angle between the two legs may be set at 90 degrees from each other such that the L shaped vane simulates an orifice plate.

Figure 4D:
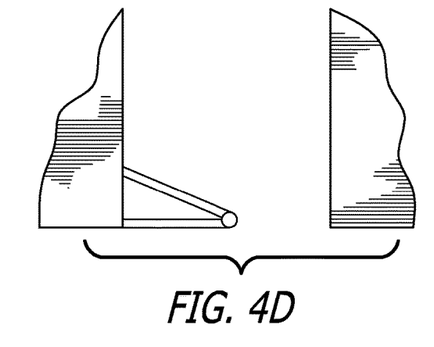
Figure 4E:
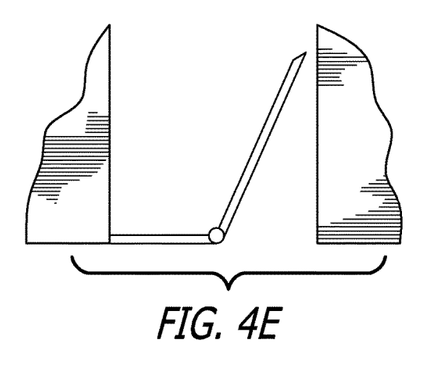

FIGS. 4D and 4E illustrate the use of an L shaped vane wherein the angle between the two legs are acute and obtuse respectively. With the acute angle, a wide asymmetrical venturi is created. With the obtuse angle an asymmetrical venturi wherein the wide portion of the venturi faces out is created.

Figure 4F:
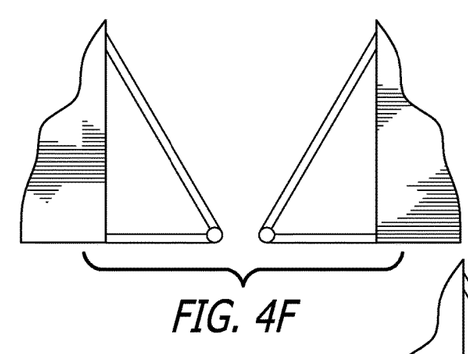
Figure 4G:
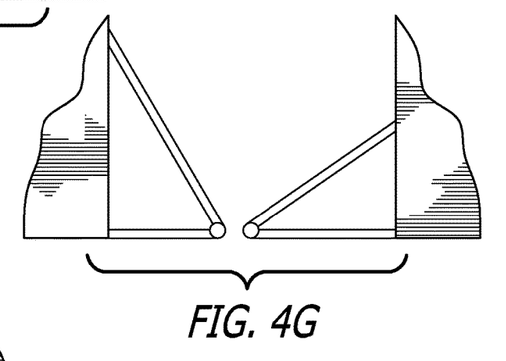
Figure 4H:
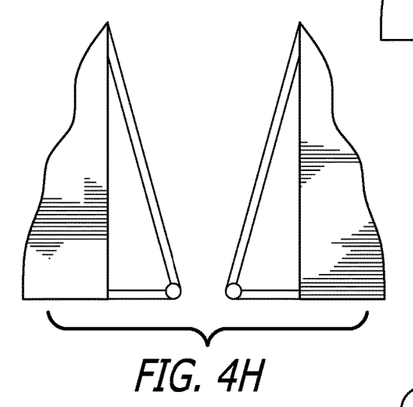

FIGS. 4F-4H illustrate some of the ways two L shaped vanes can be used to create a centered or slightly off centered venturi. The length and angles of the venturi may be adjusted to a user's preference to create the desired orifice by adjusting the L shaped vanes. With two symmetrical L shaped vanes a user may create a symmetrical venturi which would not be possible with a single L shaped vane.

Figure 4I:
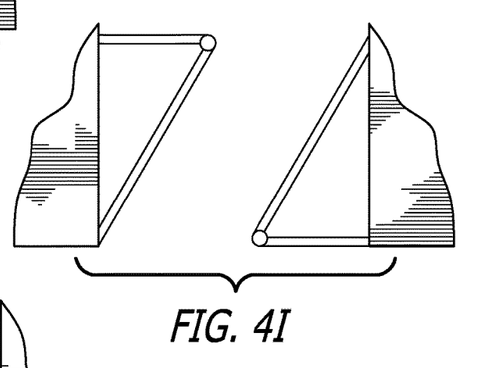
Figure 4J:
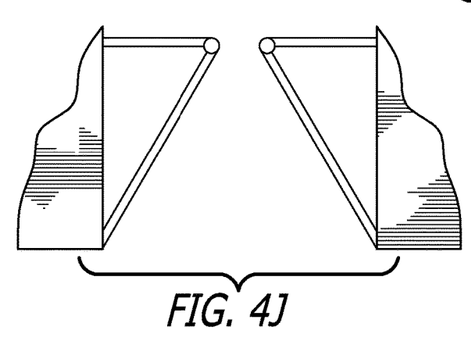

FIG. 4I illustrates how two L shaped vanes can be used to direct airflow by creating a slanted passage. Having two or more L shaped vanes allows for a user to choose the location of the orifice opening and maintain a user's desired airflow characteristics of chilled air. FIG. 4J illustrates how the venturi can be reversed by reversing the direction of the L shaped vanes.

Though several exemplary orifices and venturis are shown in FIGS. 4A-J, there are many more combinations which an ordinary skilled artisan would readily recognize and are intended to be included in the scope of the invention.

FIG. 4A-J illustrates the versatility of the disclosed invention. Because one or more of the L shaped vanes can be used to create a desired orifice, manufacturing is simplified due to the single design. Instead of having to manufacture orifice plates of several different sizes, all orifice plates can be replaced by a single adjustable L shaped vane.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

The invention claimed is:

1. An apparatus for controlling airflow in a duct of an aircraft galley chiller, comprising:
   a first leg having opposing first and second ends; and
   a second leg having opposing first and second ends, said first and second legs being connected together at said second ends of said first and second legs to form a vane having a protruding joint at said second ends of said first and second legs, and at least one of said first ends of said first and second legs being configured to be attached within the duct,
   wherein said first end of said first leg has a beveled edge, and said first end of said second leg has a flat edge, and wherein said first leg and said second leg each have at least one score line to aid cutting of the first and second legs for reduction of lengths of the first and second legs.

2. The apparatus of claim 1, wherein said at least one score line of said first leg forms an oblique angle with the first leg such that cutting of said first leg along said at least one score line of said first leg will produce a beveled edge at said first end of said first leg, and said at least one score line of said second leg forms a right angle with said second leg such that cutting of said second leg along said at least one score line of said second leg will produce a flat edge at said first end of said second leg.

3. The apparatus of claim 1, wherein said first and second legs are formed of a rigid material.

4. The apparatus of claim 1, wherein said first and second legs are formed of a solid continuous material.

5. The apparatus of claim 1, wherein said first and second legs are formed of a stiff malleable material.

6. The apparatus of claim 1, wherein said first and second legs are formed of a material that becomes malleable when heated, but is inflexible when cooled to room temperature.

7. The apparatus of claim 1, wherein said first and second legs are connected together at a predetermined fixed angle.

8. The apparatus of claim 1, wherein said first and second legs are connected together at an adjustable angle.

9. The apparatus of claim 1, wherein the at least one score line of said first leg is aligned with the at least one score line of said second leg.

10. An apparatus for controlling airflow in a duct of an aircraft galley chiller, comprising:
    a duct of an aircraft galley chiller; and
    at least one vane attached within the duct, said at least one vane including:
    a first leg having opposing first and second ends; and
    a second leg having opposing first and second ends, said first and second legs being connected together at said second ends of said first and second legs to form a vane having a protruding joint at said second ends of said first and second legs, and at least one of said first ends of said first and second legs being attached within said duct,
    wherein said first end of said first leg has a beveled edge, and said first end of said second leg has a flat edge, and wherein said first leg and said second leg each have at least one score line to aid cutting of the first and second legs for reduction of lengths of the first and second legs.

11. The apparatus of claim 10, wherein said at least one vane comprises first and second vanes attached within opposing sides of the duct, said first and second vanes forming a venturi within said duct.

12. The apparatus of claim 10, wherein said at least one score line of said first leg forms an oblique angle with the first leg such that cutting of said first leg along said at least one score line of said first leg will produce a beveled edge at said first end of said first leg, and said at least one score line of said second leg forms a right angle with said second leg such that cutting of said second leg along said at least one score line of said second leg will produce a flat edge at said first end of said second leg.

13. The apparatus of claim 10, wherein said first and second legs are formed of a rigid material.

14. The apparatus of claim 10, wherein said first and second legs are formed of a solid continuous material.

15. The apparatus of claim 10, wherein said first and second legs are formed of a stiff malleable material.

16. The apparatus of claim 10, wherein said first and second legs are connected together at a predetermined fixed angle.

17. The apparatus of claim 10, wherein said first and second legs are connected together at an adjustable angle by an adjustable hinge.

18. The apparatus of claim 10, wherein said first leg and said second leg are composed of a non-metal material.

19. The apparatus of claim 10, wherein the at least one score line of said first leg is aligned with the at least one score line of said second leg.

\* \* \* \* \*